Figure 1:
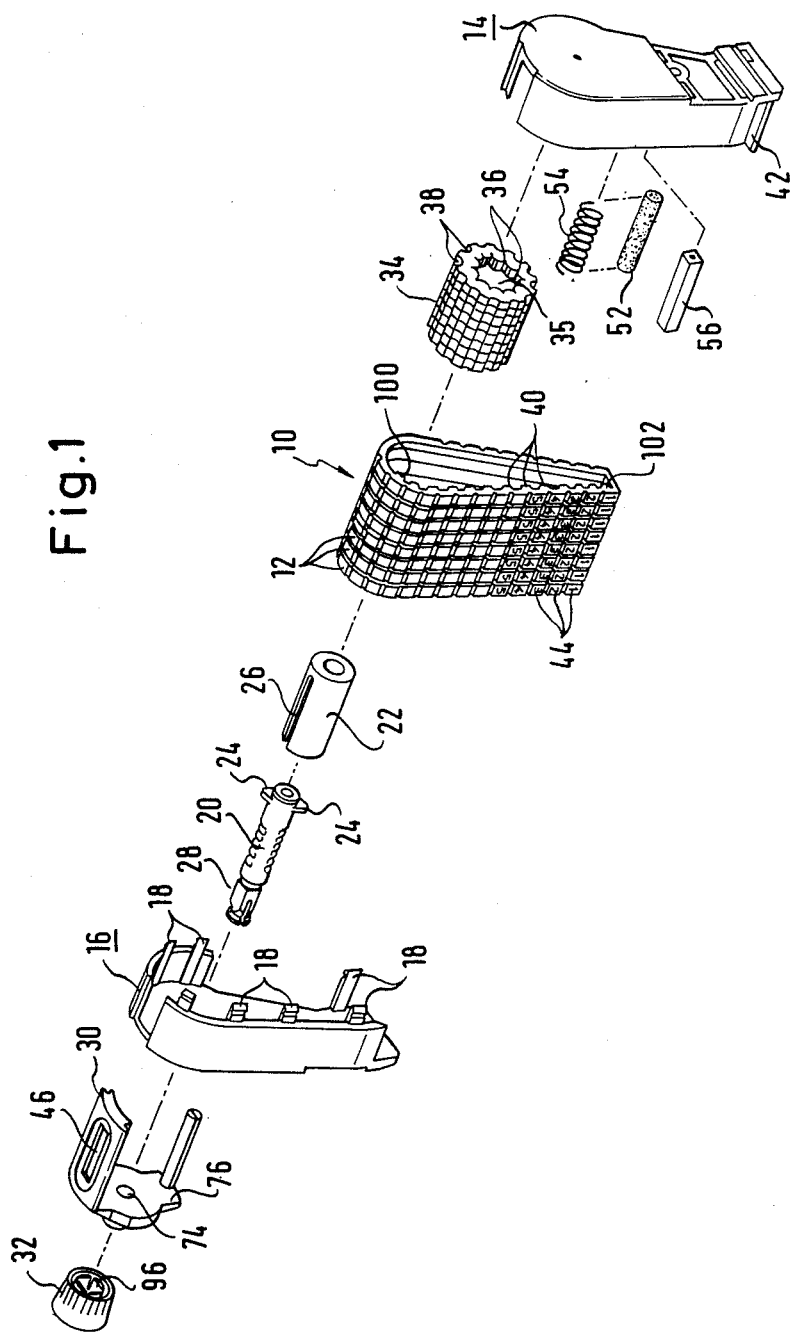

United States Patent [19]

Volk

[11] Patent Number: 4,951,565

[45] Date of Patent: * Aug. 28, 1990

[54] PRINTING MECHANISM WITH TORQUE LIMITING DETENT ELEMENTS ON ACTUATING KNOB

[75] Inventor: Heinrich Volk, Beerfelden-Gammelsbach, Fed. Rep. of Germany

[73] Assignee: Esselte Meto International GmbH, Hirshhorn, Fed. Rep. of Germany

[ * ] Notice: The portion of the term of this patent subsequent to May 17, 2005 has been disclaimed.

[21] Appl. No.: 934,037

[22] Filed: Nov. 24, 1986

[30] Foreign Application Priority Data

Oct. 21, 1986 [DE] Fed. Rep. of Germany ....... 3635734

[51] Int. Cl.⁵ ............................................. B41J 1/20
[52] U.S. Cl. ..................................... 101/111; 101/105
[58] Field of Search .................. 101/111, 105; 464/37, 464/41; 74/527

[56] References Cited

U.S. PATENT DOCUMENTS

| | | | |
|---|---|---|---|
| 1,092,574 | 4/1914 | Jansson | 464/37 |
| 2,546,633 | 3/1951 | Dodge | 192/56 R |
| 2,919,602 | 1/1960 | Spraragen | 74/553 |
| 4,275,654 | 6/1981 | Hamisch, Jr. et al. | 101/111 X |
| 4,662,276 | 5/1987 | Schrotz | 101/111 |

FOREIGN PATENT DOCUMENTS

| | | | |
|---|---|---|---|
| 2064435 | 6/1981 | United Kingdom | 101/111 |
| 2167349 | 5/1986 | United Kingdom | 101/111 |

Primary Examiner—Edgar S. Burr
Assistant Examiner—Tonya Lamb
Attorney, Agent, or Firm—Sixbey, Friedman, Leedom & Ferguson

[57] ABSTRACT

A printing mechanism is described having a plurality of type carriers (12, 34) which at their outer peripheral face carry in one region printing types and in another region indicator types (44). The printing types can be brought by turning the type carriers (12, 34) into a printing position. The turning travel of the type carriers (12, 34) can be limited with the aid of stop means (100, 102, 104, 106, 110). By means of a setting means (32, 20, 24) which can be brought by axial displacement into a drive connection with each of the type carriers (12, 34) each type carrier (12, 34) can be turned. A torque limiting means (96) permits transfer of a limited torque between a first component (32) and a second component (20) of the setting means. A securing means (68, 72) serves for axially fixed connection of the first component (32) to the second component (20). The torque limiting means is formed by resilient detent elements (96) which are disposed on the first component (32) and which are in engagement with complementary detent elements (66) on the second component (20). The securing means (68, 72) is disposed on the second component (20).

4 Claims, 5 Drawing Sheets

PRINTING MECHANISM WITH TORQUE LIMITING DETENT ELEMENTS ON ACTUATING KNOB

The invention relates to a printing mechanism comprising a plurality of type carriers which at their outer peripheral face carry in one region printing types and in another region indicator types, the printing types being adapted by turning the type carriers to be brought into a printing position, stop means for limiting the turning travel of the type carriers and a setting means which by axial displacement can be brought into a drive connection with each of the type carriers for rotation thereof, and a torque limiting means for transmitting a limited torque between a first and a second component of the setting means and a securing means for axially fixedly connecting together the first and the second component.

Such a printing mechanism is known from DE-PS No. 3,406,762. In this known printing mechanism the stop means prevent the type carriers being turned by rotation of the setting knob and the setting shaft connected thereto to such an extent that the indicator types reach the printing position and in this position come into contact with the printing ink. This would greatly impair the good legibility of the indicator types. It has been found in practice that stop means frequently do not prevent the operator from attempting by applying high force to move the type carriers beyond the end positions defined by the stop means. This can possibly result in damage to the printing mechanism. To prevent this, in the known printing mechanism between a setting shaft and an actuating knob mounted thereon a slip coupling is provided which slips and prevents further turning of the type carriers and of the particular type carrier coupled thereto as soon as the torque transmitted by the actuating knob to the setting shaft is greater than the torque necessary for turning the type carriers. As a result, when the stop means become operative the actuating knob slips on the setting shaft so that application of a greater force by the operator cannot have any damaging effects on the printing mechanism.

In the known printing mechanism the limit torque at which the slipping of the slip coupling or clutch starts is defined by the cooperation of the material of the actuating knob and the fit with which the actuating knob is mounted on the setting shaft. It has been found that the exact maintenance of the limit torque leads to difficulties because it requires high constancy of the material properties of the actuating knob. Also, factors on which the printing mechanism manufacturer has no influence can affect the limit torque; for example, the limit torque is drastically reduced when oil gets onto the setting shaft. In this case it may for example be reduced to such an extent that normal adjustment of the type carriers is no longer possible because the actuating knob slips on the setting shaft as soon as the adjusting torque is applied.

The use of torque transmitting means in which the problems outlined do not occur cannot be easily implemented in a printing mechanism of the type outlined because only very little space is available and the functionability must not be impaired. Another problem is that the two components between which the torque is to be transmitted must be connected together in axially fixed manner and this further aggravates the space problems.

The invention is accordingly based on the problem of providing a printing mechanism in which the problems outlined in conjunction with the use of a slip coupling between the first and the second component of the setting means no longer occur and at the same time a reliable connection of the two components preventing any relative movement in the axial direction is obtained.

This problem is solved according to the invention in that the torque limiting means are resilient detent elements which are disposed on the first component and which engage complementary detent elements on the second component and that the securing means is disposed on the second component.

The detent elements used in the printing mechanism according to the invention to implement the torque limiting means provide because of their spring hardness a detent moment which is well reproducible during the production and which is also not changed by environmental influences even over longer periods of time.

In spite of the use of these detent elements, which require a certain spring travel to develop their effect, the securing means for axially fixed connection of the first and second components together can be implemented because it is provided on the second component. By arranging the torque limiting means and the securing means each on different components the two means can be formed in a manner effective for the intended purpose without mutually impairing each other.

Advantageous further developments of the invention are characterized in the subsidiary claims.

Figure 2:
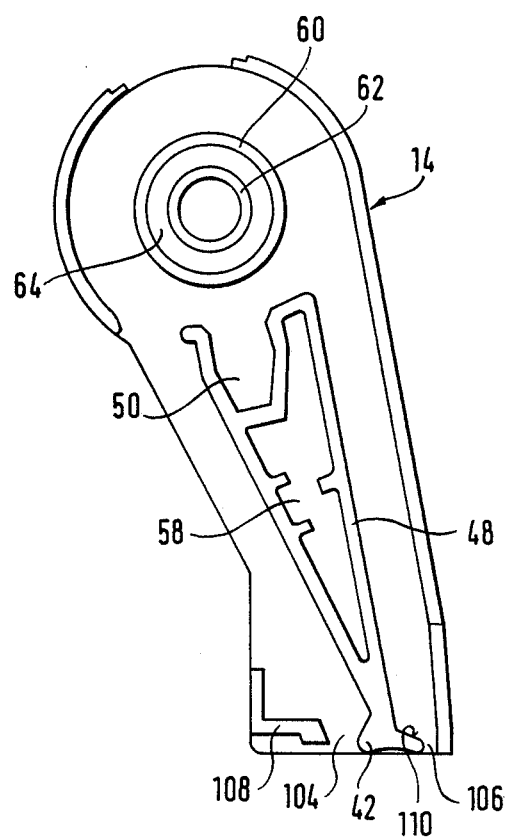
Figure 3:
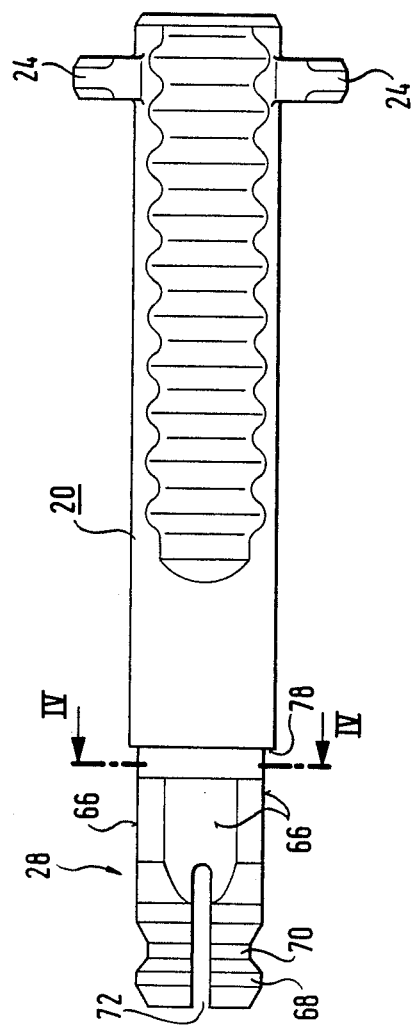
Figure 4:
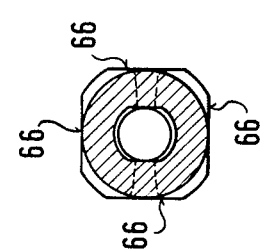
Figure 5:
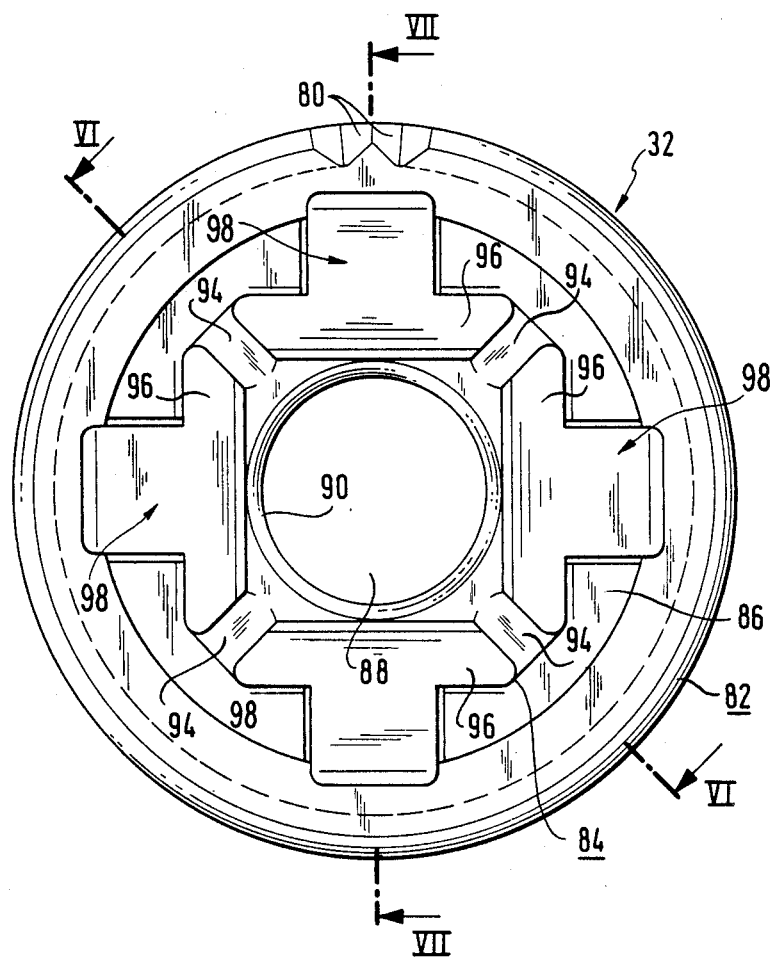
Figure 7:
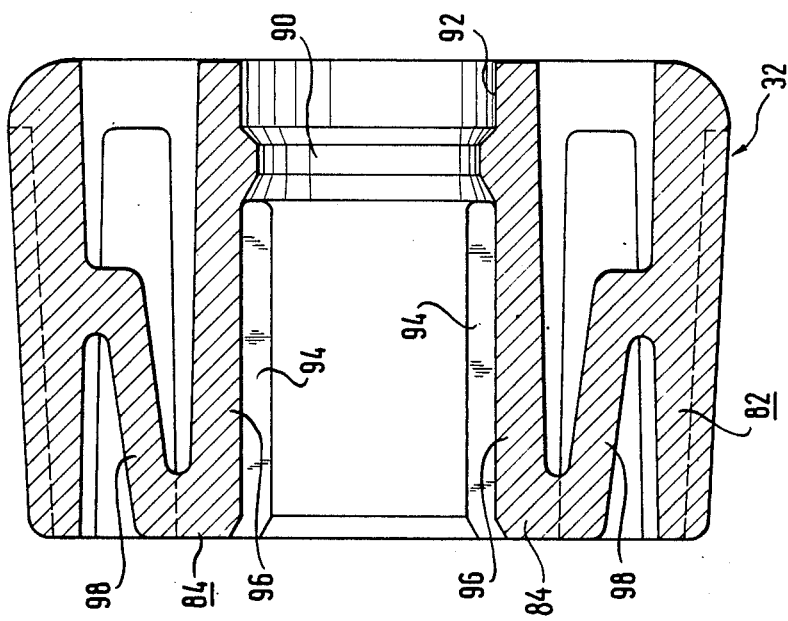
Figure 6:
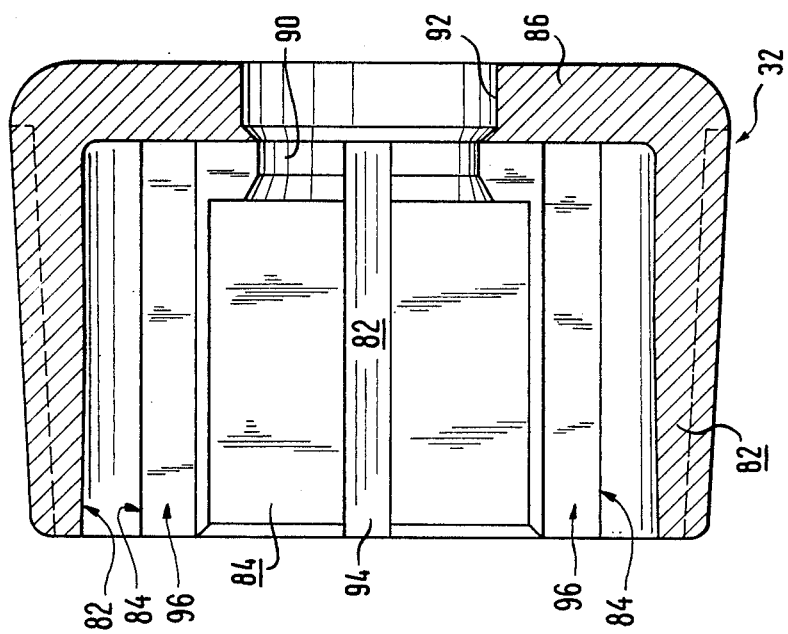

The invention will now be explained by way of example with reference to the drawings, wherein:

FIG. 1 is an exploded view of a printing mechanism according to the invention,

FIG. 2 is an inner view of the right housing half of the printing mechanism of FIG. 1, FIG. 3 is a view of the setting shaft for adjusting the type carriers, FIG. 4 is a section along the line A—A of FIG. 3, FIG. 5 is a view of the actuating knob in the illustration of FIG. 1 seen from the right side, FIG. 6 is a section along the line B—B of FIG. 5 and FIG. 7 is a section along the line C—C of FIG. 5.

The printing mechanism 10 illustrated in FIG. 1 is a stamp printing mechanism in which type bands 12 are used as type carriers. The printing mechanism includes two housing halves 14 and 16 which can be connected together by snap hooks 18. A setting shaft 20 is rotatably disposed as one component of a setting means in the housing half 16 and over said shaft a slit sleeve 22 is pushed. Drivers 24 formed at the end of the setting shaft 20 engage through slots 26 in the sleeve 22 beyond the outer periphery thereof. On the end region 28 of the setting shaft 20 there is a window support 30 and as further component of the setting means an actuating knob 32 with the aid of which the setting shaft 20 can be turned and axially displaced. On displacement of the setting shaft 20 the window support 30 is also axially displaced and the drivers 24 slide axially along the slots 26 in the sleeve 22. Mounted on the sleeve 22 are setting wheels 34 which at their inner peripheral face surrounding a central opening 35 have grooves 36 into which the drivers 24 of the setting shaft 20 engage. By axial displacement of the setting shaft 20 the drivers 24 can be brought into engagement with grooves 36 of a setting wheel 34. In this manner by turning the actuating knob 32 in succession each of the setting wheels 34 can be turned. The setting wheels 34 are also provided at their outer peripheral face with grooves 38 into which engage projections 40 disposed on the inner peripheral face of the type bands 12. In this manner the type bands 12 can be moved via the engagement between the drivers 24 and the grooves 36 and the engagement between the grooves 38 and the projections 40.

In the printing mechanism the type bands 12 are led round the setting wheels 34 and also engage round a printing web 42 located at the lower end face of the housing half 14 and serving as deflection edge for the type bands 12. The printing type which happens to be under the printing web 42 in the particular setting of the type bands 12 generates the desired imprint in each case. In this connection it is pointed out that on the type bands 12 in FIG. 1 only some of the indicator types are represented; the printing types are on the back, not visible in FIG. 1, of the type carrier set formed by the type carriers 12. The visible indicator types 44 and the associated printing types are disposed on the type bands 12 in such a manner that whenever a printing type is located beneath the printing web 42 in the printing position the corresponding indicator type is visible through a window 46 in the window support 30. In this manner it is always apparent through the window 46 which particular printing types are located in the printing position beneath the printing web 42.

According to FIG. 2 the printing web 42 is disposed integrally on the lower end of a support element 48 connected to the housing half 14. At its upper end the support element 48 has a recess 50 in which in the assembled state of the printing mechanism a rubber strip 52 and thereabove a helical spring 54 are disposed. The rubber strip 52 and the helical spring 54 have together a height such that the helical spring 54 projects upwardly out of the recess 50 and comes into contact with the setting wheels 34 arranged thereabove. The helical spring 54 exerts a limited holding force on the setting wheels which opposes the rotation thereof. When a setting wheel 34 is turned by turning the setting shaft 20 by means of the actuating knob 32 the operator feels a detent force which must be overcome every time a type band 12 is to be adjusted stepwise so that one printing type after the other comes to lie beneath the printing web 42.

By means of a square member 56 inserted into a recess 58 in the support element 48 and having a width corresponding to the internal width of the two housing halves 14, 16, the stamp printing mechanism can for example be screwed to a printing mechanism support of a hand labeling device. The corresponding screws not shown in FIG. 2 can be inserted through holes in the housing halves 14, 16 and screwed into threaded bores in the ends of the square member 56.

For mounting the sleeve 22 in the housing half 14 two annular collars 60, 62 are provided whose radial spacing forms a recess 64, the radial dimension of which is equal to the wall thickness of the sleeve 22 so that the latter can be inserted into the recess and held by the annular collars 60 and 62. The inner annular collar 62 engages on the inside into the sleeve 22 whilst the outer annular collar 60 engages the sleeve 22 on the outside. The two annular collars have only a slight axial extent so that in each case they secure only the end of the sleeve 22 furthest to the right in FIG. 1.

In FIG. 3 the setting shaft of the printing mechanism of FIG. 1 is shown in an enlarged view. The end region 28 of the setting shaft 20 destined to receive the actuating knob 32 has a partially square cross-section with rounded corners resulting in four detent faces 66. Directly at the end the setting shaft 20 comprises a bead 68 and an adjoining peripheral groove 70. A diametrical slot 72 formed in the end region 28 of the setting shaft 20 provides a certain elasticity of said end region and yieldability of the bead 68. The bead 68 and the peripheral groove 70 serve to firmly secure the actuating knob 32 pushed onto the end region 28 without said knob having to be secured with the aid of additional means. The manner in which this securing is effected will become apparent hereinafter from the description of the form of the actuating knob.

In the assembled state the end region 28 of the setting shaft 20 projects through an opening 74 in one side plate 76 of the window support 30, the step 78 on the setting shaft 20 acting as stop preventing a further insertion of the setting shaft 20 into the opening 74. The portion of the end region 28 having the square cross-section projects out of the opening 74 in the side plate 76 to the left in the view of FIG. 1 so that the actuating knob 32 can be pushed onto the end region.

According to FIGS. 5, 6 and 7 the actuating knob 32 is made slightly conical at its outer peripheral face to facilitate gripping and operation. To increase the grip the outer peripheral face is knurled which is indicated in FIG. 5 for simplicity of the drawings only by means of two knurl grooves 80. The actuating knob 32 comprises an outer sleeve 82 and an inner sleeve 86 which is connected to the outer sleeve 82 at the end face of the actuating knob 32. The inner sleeve 84 surrounds an inner cavity 88 which in the region of the end face 86 has a constriction in the form of an annular bead 90. When the actuating knob 32 is pushed onto the setting shaft the annular bead 90, utilizing the yieldability provided by the slot 72, compresses the bead 68 until the annular bead 90 slides into the peripheral groove 70. The bead 68 then comes to lie in the widened portion 92 in the actuating knob 32 so that said knob is firmly held on the setting shaft 20. The slit end of the setting shaft with the bead 68 forms a securing means which connects the actuating knob 32 axially fixedly to the setting shaft 20.

The inner sleeve 84 of the actuating knob 32 has a substantially square cross-section as apparent in FIG. 5. At the corners of the square form slots 94 are formed in the axial direction so that four axially extending detent fingers 96 result which when the actuating knob 32 is pushed onto the end region 28 of the setting shaft 20 come to bear against the detent faces 66. If no resistance torque opposes the turning of the setting shaft 20 the latter can be turned by means of the pushed-on actuating knob 32 due to the cooperation of the detent fingers 96 with the detent faces 66. Because of the presence of the slots 94 the detent fingers 96 can be deflected in the radial direction and act as springs having a specific spring hardness. This spring hardness is defined by the material and the constructional configuration of the detent fingers.

FIG. 7 shows that the free ends of the detent fingers 96 are connected via connecting webs 98 to the outer sleeve, the point at which the connecting webs are joined to the outer sleeve 82 lying substantially in the centre of the longitudinal extent of the outer sleeve 82. These connecting webs increase the spring hardness of the detent fingers but otherwise have no influence on the detent fingers 96 behaving like leaf springs clamped at one end.

As mentioned, the actuating knob 32 pushed onto the setting shaft 20 entrains said shaft on rotation as long as no resistance moment opposes the rotation of the setting shaft 20.

The printing mechanism of FIG. 1 is however so designed that the type bands 12 on rotation of the setting shaft 20 can execute only a predetermined adjustment travel, any further rotation being opposed by a very large resistance moment. This large resistance moment is produced by providing on the inner peripheral face of the type bands 12 projections 100 and 102 which are so dimensioned that they do not pass through a gap 106 between the printing web 42 and the wall of the housing 14 or a gap between the printing web 42 and a stop web 108 connected to the housing 14. The two projections 100 and 102 thus limit the adjustment travel of the type bands in both adjustment directions so that although all the printing types can be moved to a position beneath the printing web 42 the indicator types 44 associated with the printing types cannot reach this position. Thus, when a type band has been adjusted to such an extent that the projection 100 has come to bear on the upper edge 110 of the printing web 42 the resistance moment opposing the further rotation increases greatly. The spring hardness of the detent fingers 96 is so dimensioned that in this situation a deflection of the spring fingers 96 radially outwardly occurs so that the detent force exerted by the detent fingers 96 is overcome and the actuating knob 32 slips on the end region 28 of the setting shaft 20. In this manner the torque which can be transferred is limited so that it is not possible to damage the printing mechanism by forced further rotation of the actuating knob 32.

In the other direction of rotation the projection 102 leads to the great increase in the resistance moment.

I claim:

1. Printing mechanism comprising in combination: a plurality of type carriers which at their outer peripheral face carry in one region printing types and in another region indicator types, the printing types being adapted by turning the type carriers to be brought into a printing position, stop means for limiting the turning travel of the type carriers, a setting means which is axially displaceable so as to selectively form a drive connection with each of the type carriers for rotation thereof, the setting means having a first component and a second component, the first and second components being rotatable together when the stop means is not engaged on the type carrier being driven by the setting means, with said first component being an actuating knob and the second component being a setting shaft which carries said actuating knob on an end region thereof and which extends through central openings in the type carriers, a torque limiting means for limiting a transmitted torque between the first and second components of the setting means to a predetermined value, and a securing means for connecting the first and second components together against axial displacement while permitting relative rotational displacement between the first and second components upon application of a torque which exceeds the predetermined value, said torque limiting means including resilient detent elements in the form of axially extending detent fingers which are disposed on the actuating knob which engage complementary detent faces on the setting shaft, wherein the actuating knob includes an other sleeve and an inner sleeve connected thereto at an end wall of the actuating knob, the inner sleeve having axial slots forming the detent fingers, a portion of the end region of the setting shaft receiving the actuating knob being in cross-section a polygon whose side faces form detent faces with the number of detent faces being equal to the number of the detent fingers, and a connecting web is disposed between the free end of each detent finger and a point lying substantially in the center of the longitudinal extent of the outer sleeve, the securing means being disposed on the second component.

2. Printing mechanism according to claim 1 wherein the polygonal portion of the end region of the setting shaft receiving the actuating knob is square in cross-section.

3. Printing mechanism comprising in combination: a plurality of type carriers which at their outer peripheral face carry in one region printing types and in another region indicator types, the printing types being adapted by turning the type carriers to be brought into a printing position, stop means for limiting the turning travel of the type carriers, a setting means which is axially displaceable so as to selectively form a drive connection with each of the type carriers for rotation thereof, the setting means having a first component and a second component, the first and second components being rotatable together when the stop means is not engaged on the type carrier being driven by the setting means, with said first component being an actuating knob and the second component being a setting shaft which carries said actuating knob on an end region thereof and which extends through central openings in the type carriers, a torque limiting means for limiting a transmitted torque between the first and second components of the setting means to a predetermined value, and a securing means for connecting the first and second components together against axial displacement while permitting relative rotational displacement between the first and second components upon application of a torque which exceeds the predetermined value, said torque limiting means including resilient detent elements in the form of axially extending detent fingers which are disposed on the actuating knob which engage complementary detent faces on the setting shaft, wherein the actuating knob includes an outer sleeve and an inner sleeve connected thereto at an end wall of the actuating knob, the inner sleeve having axial slots forming the detent fingers, a portion of the end region of the setting shaft receiving the actuating knob being in cross-section a polygon whose side faces form detent faces with the number of detent faces being equal to the number of the detent fingers, with said inner sleeve defining an inner cavity and said inner cavity comprises in the region of the end wall of the actuating knob a constriction of circular cross-section, said circular cross-section having an inner diameter, said securing means comprising a bead at the end of said setting shaft and therebehind a peripheral groove, the diameter of the bead being and the diamter of the groove being equal to said inner diameter, greater than the inner diameter and the setting shaft comprising in the end region carrying the actuating knob a diametrically extending slot, the securing means being disposed on the second component.

4. Printing mechanism according to claim 3, wherein the polygonal portion of the end region of the setting shaft receiving the actuating knob is square in cross-section.

* * * * *